United States Patent
Gu et al.

(10) Patent No.: US 12,141,704 B2
(45) Date of Patent: *Nov. 12, 2024

(54) NEURAL FLOW ATTESTATION

(71) Applicant: International Business Machines Corporation, Armonk, NY (US)

(72) Inventors: Zhongshu Gu, Ridgewood, NJ (US); Xiaokui Shu, Ossining, NY (US); Hani Jamjoom, Cos Cob, CT (US); Tengfei Ma, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/236,590

(22) Filed: Aug. 22, 2023

(65) Prior Publication Data

US 2023/0394324 A1 Dec. 7, 2023

Related U.S. Application Data

(63) Continuation of application No. 16/750,328, filed on Jan. 23, 2020, now Pat. No. 11,783,201.

(51) Int. Cl.
  *G06N 3/10* (2006.01)
  *G06N 3/04* (2023.01)
  *G06N 3/08* (2023.01)

(52) U.S. Cl.
  CPC ............... *G06N 3/10* (2013.01); *G06N 3/04* (2013.01); *G06N 3/08* (2013.01)

(58) Field of Classification Search
  None
  See application file for complete search history.

(56) References Cited

U.S. PATENT DOCUMENTS

| 10,223,610 B1 | 3/2019 | Akselrod-Ballin et al. |
| 11,301,762 B1 | 4/2022 | Chen et al. |

(Continued)

FOREIGN PATENT DOCUMENTS

| CN | 105373785 A | 3/2016 |
| CN | 107544904 A | 1/2018 |

(Continued)

OTHER PUBLICATIONS

International Search Report and Written Opinion dated Apr. 26, 2021 for International Application No. PCT/IB2021/050346, 11 pages.

(Continued)

*Primary Examiner* — Vikkram Bali

(74) *Attorney, Agent, or Firm* — Stephen J. Walder, Jr.; Anthony Pallone

(57) ABSTRACT

Mechanisms are provided to implement a neural flow attestation engine and perform computer model execution integrity verification based on neural flows. Input data is input to a trained computer model that includes a plurality of layers of neurons. The neural flow attestation engine records, for a set of input data instances in the input data, an output class generated by the trained computer model and a neural flow through the plurality of layers of neurons to thereby generate recorded neural flows. The trained computer model is deployed to a computing platform, and the neural flow attestation engine verifies the execution integrity of the deployed trained computer model based on a runtime neural flow of the deployed trained computer model and the recorded neural flows.

23 Claims, 8 Drawing Sheets

(56) References Cited

U.S. PATENT DOCUMENTS

| | | |
|---|---|---|
| 2008/0306365 A1 | 12/2008 | Bunce et al. |
| 2009/0132219 A1 | 5/2009 | Paterson |
| 2019/0279383 A1 | 9/2019 | Angelova et al. |
| 2020/0225321 A1 | 7/2020 | Kruglick et al. |
| 2021/0142222 A1 | 5/2021 | Chang et al. |
| 2021/0150541 A1 | 5/2021 | Gurbuxani et al. |
| 2021/0232933 A1 | 7/2021 | Gu et al. |

FOREIGN PATENT DOCUMENTS

| | | |
|---|---|---|
| EP | 3471005 A1 | 4/2019 |
| JP | 2018514840 A | 6/2018 |
| WO | WO2016140701 A1 | 9/2016 |
| WO | WO2019076866 A1 | 4/2019 |
| WO | WO2020002210 A1 | 1/2020 |

OTHER PUBLICATIONS

List of IBM Patents or Patent Applications Treated as Related, Aug. 22, 2023, 2 pages.

Abera, Tigist et al., "C-FLAT: Control-Flow Attestation for Embedded Systems Software", Proceedings of the 2016 ACM SIGSAC Conference on Computer and Communications Security, Oct. 24-29, 2016, 12 pages.

Chen, Huili et al., "DeepAttest: An End-to-End Attestation Framework for Deep Neural Networks", The 46th International Symposium on Computer Architecture (ISCA'19), Jun. 22-26, 2019, 12 pages.

Dessouky, Ghada et al., "LO-FAT: Low-Overhead Control Flow ATtestation in Hardware", Proceedings of the 54th Annual Design Automation Conference 2017, arXiv: 1706.03754v1 [cs.CR], Jun. 12, 2017, 7 pages.

Ma, Shiqing et al., "NIC Detecting Adversarial Samples with Neural Network Invariant Checking", 26th Annual Network and Distributed System Security Symposium (NDSS) 2019, Feb. 24-27, 2019, 15 pages.

Notice of Reasons for Refusal dated Jun. 6, 2024 for Japanese Patent Application No. 2022-539370, 3 pages.

Nakamura, Megumi et al., "Security Enhancement of http-fuse Knoppix Client by Trusted Computing", IEICE Technical Report, vol. 106. No. 175, The Institute of Electronics, Information and Communication Engineers, Jul. 2006, Abstract in English, 9 pages.

NEURAL FLOW ATTESTATION

BACKGROUND

The present application relates generally to an improved data processing apparatus and method and more specifically to mechanisms for performing neural flow attestation.

Deep learning systems have been widely deployed as part of artificial intelligence (AI) services due to their ability to approach human performance when performing cognitive tasks. Deep learning is a class of machine learning technology that uses a cascade of multiple layers of nonlinear processing units for feature extraction and transformation. Each successive layer uses the output from the previous layer of input. The deep learning system is trained using supervised, e.g., classification, and/or unsupervised, e.g., pattern analysis, learning mechanisms. The learning may be performed with regard to multiple levels of representations that correspond to different levels of abstraction, with the levels forming a hierarchy of concepts.

Most modern deep learning models are based on an artificial neural network, although they can also include propositional formulas or latent variables organized layer-wise in deep generative models such as the nodes in Deep Belief Networks and Deep Boltzmann Machines. In deep learning, each level, e.g., layer of the neural network, learns to transform its input data into a slightly more abstract and composite representation. In a facial image recognition application, for example, the raw input may be a matrix of pixels with multiple layers of abstraction of the pixels as recognized features. Importantly, a deep learning process can learn which features to optimally place in which level on its own, but this does not completely obviate the need for hand-tuning. For example, hand tuning may be used to vary the number of layers and layer sizes so as to provide different degrees of abstraction.

The "deep" in "deep learning" refers to the number of layers through which the data is transformed. More precisely, deep learning systems have a substantial credit assignment path (CAP) depth. The CAP is the chain of transformations from input to output. CAPs describe potentially causal connections between input and output. For a feedforward neural network, the depth of the CAPs is that of the network and is the number of hidden layers plus one (as the output layer is also parameterized). For recurrent neural networks, in which a signal may propagate through a layer more than once, the CAP depth is potentially unlimited. No universally agreed upon threshold of depth divides shallow learning from deep learning, but most researchers agree that deep learning involves a CAP depth greater than 2. CAP of depth 2 has been shown to be a universal approximator in the sense that it can emulate any function. Beyond that, more layers do not add to the function approximator ability of the network, but the extra layers help in learning features.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system comprising at least one processor and at least one memory, the at least one memory comprising instructions that are executed by the at least one processor to configure the at least one processor to implement a neural flow attestation engine. The method comprises inputting, by the neural flow attestation engine, input data to a trained computer model, wherein the trained computer model comprises a plurality of layers of neurons. The method also comprises recording, by the neural flow attestation engine, for a set of input data instances in the input data, an output class generated by the trained computer model and a neural flow through the plurality of layers of neurons to thereby generate recorded neural flows. The output class is one of a plurality of possible output classes. The method further comprises deploying the trained computer model to a computing platform, and verifying, by the neural flow attestation engine, an integrity of the deployed trained computer model based on a runtime neural flow of the deployed trained computer model and the recorded neural flows.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
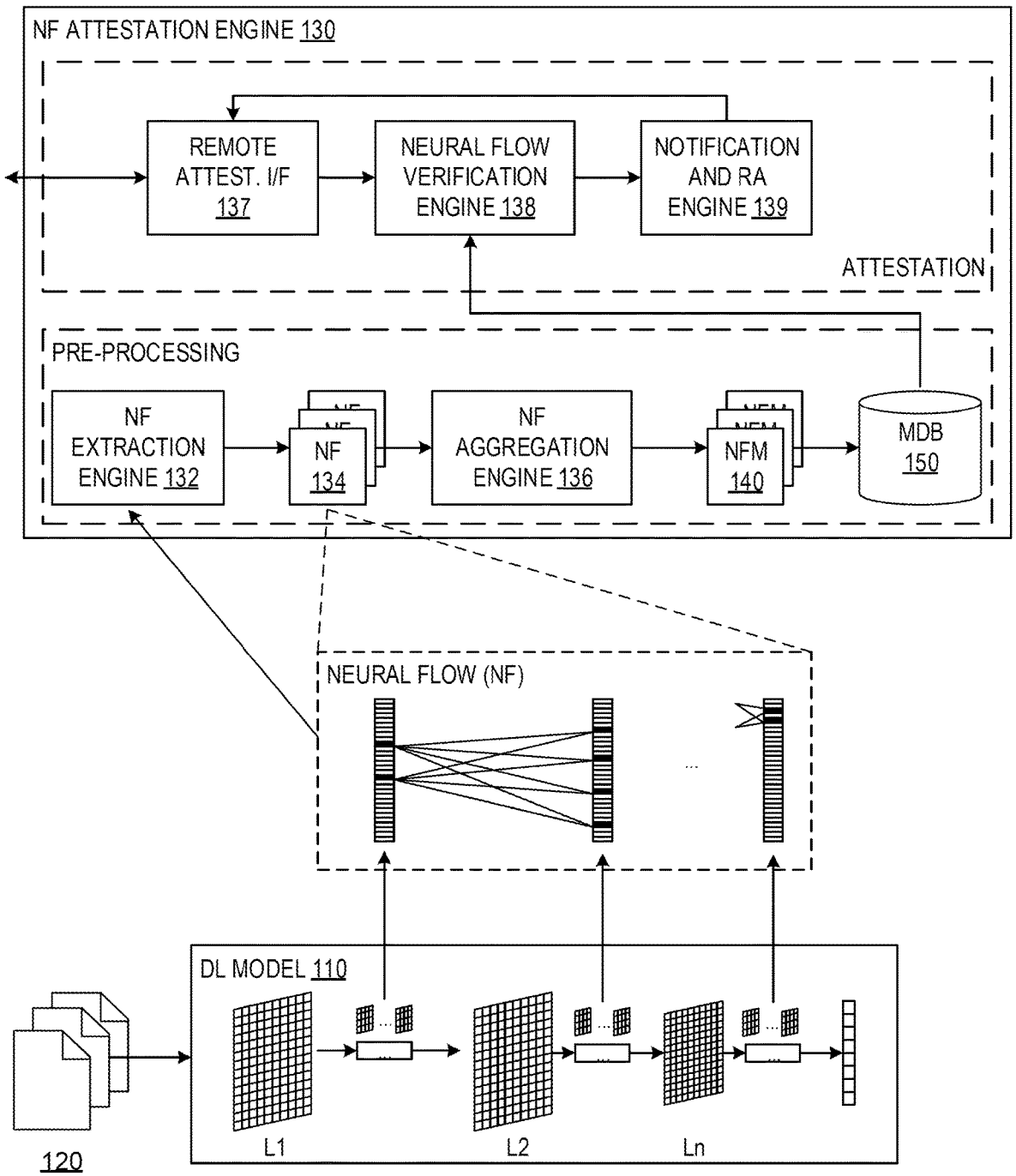
FIG. 1 is an example diagram illustrating a pre-processing stage of operation in which neural flow information is gathered for training data used to train a computer model, in accordance with one illustrative embodiment.

Artificial intelligence (AI) systems and AI services utilize machine learning (ML) models as part of their backend engines. For example, many AI systems and services use deep neural networks (DNNs), which are also referred to as deep learning models, to perform the underlying intelligence operations in support of the system operation and services. The present invention is specifically directed to an improved computer tool to assist with ensuring the execution integrity of such machine learning models in various computer runtime environments, and in some illustrative embodiments, cloud computing environments. It should be appreciated that the illustrative embodiments described herein will refer to computer models, which is intended to reference any type of machine learning computer model. Deep learning models, which are a type of neural network having two or more intermediate layers of neurons, are used as a primary example of a computer model with which the illustrative embodiments may be utilized. However, the implementation of the illustrative embodiments with deep learning models is not intended to be limiting on the potential applications of the illustrative embodiments. To the contrary, any other known or later developed neural network models of various numbers or sizes of intermediate layers, in which the illustrative embodiments may be implemented, are considered to be within the spirit and scope of the present invention.

Deep learning models are being used more prevalently in public cloud computing environments (also referred to herein simply as "cloud" platforms, environments, etc.) to provide artificial intelligence cloud services, e.g., image recognition and analysis services, facial recognition, decision support services, and the like. For example, many cloud computing environments are multi-tenant cloud computing environments, or cloud platforms, in which the architecture allows customers (or tenants) to share computing resources in a public, or even private, cloud, the computing resources including hardware and software provided by a cloud provider. Each tenant's data is isolated and remains invisible to the other tenants. Most public cloud providers use the multi-tenancy architecture. With regard to DL models, each tenant may utilize a separate DL model instance. The DL model itself may be provided by a third party or even by the cloud provider, with individual instances of the DL model being specifically configured for a particular tenant and the particular cloud services they wish to provide.

Deploying deep learning (DL) models in public cloud computing environments is an efficient way to bootstrap artificial intelligence services, however cloud computing tenants generally have concerns about the runtime integrity of the deployed DL model execution in such public cloud computing environments. These concerns are based on three main perspectives of cloud computing tenants. First, attackers who may be capable of penetrating cloud platforms, tend to inject backdoors, i.e. undocumented ways of gaining access to a program, online service, or computing system by bypassing normal authentication mechanisms, into DL models. Such backdoors can be activated by maliciously crafted inputs with special embedded patterns, e.g., watermarks in image data, a trojan horse (or "trojan"), or the like. Thus, attackers can deviate the DL model execution and influence the final predictions for their own benefits.

Second, cloud platform providers may have financial incentives to replace a tenant's DL model with a pruned or "squeezed" counterpart, which can reduce storage and computation cost with some degree of precision loss. That is, DL model trainers can re-train the DL model by trying to remove some components, e.g., connections, neurons, or layers, in the DL model. However, the DL model trainers need to guarantee that the pruned model can achieve the same level of accuracy as the original DL model. Therefore, cloud providers, i.e. entities providing the computing resources to host cloud services, may significantly decrease their operative costs for serving the model online. However, tenants with a high standard of precision may not accept such model transformation and replacement. This may also lead to an accountability problem, i.e. determining who is responsible for mis-predictions at runtime since such model transformations/replacements may be a cause of the mis-prediction, or the original model may have been the cause of the mis-prediction.

Third, existing DL models are known to be susceptible to adversarial attacks. Attackers may exploit DL model vulnerabilities to craft adversarial samples as online prediction inputs. Such adversarial inputs will be misclassified to categories pre-determined by the attackers. Cloud tenants tend to detect those misclassified samples and analyze why they are classified to specific categories differently from the training data. In addition, cloud tenants can collect those misclassified samples to conduct adversarial training to further enhance their DL model's robustness. As will be described hereafter, it will be appreciated that with the mechanisms of the illustrative embodiments, and the implementation of neural flow attestation of the illustrative embodiments, adversarial examples are able to be detected at runtime and these adversarial examples can be collected for further investigation.

The illustrative embodiments provide mechanisms to address the problem of computer model (or simply "model"), e.g., a deep learning (DL) model, execution integrity in various computing platforms, such as public cloud platforms and data processing environments. The illustrative embodiments provide a runtime neural flow attestation scheme for verifying the computer model's execution integrity at the abstraction level of neural flows. A neural flow is the order of execution of a deep learning model and is represented by cross-layer neuron activation status corresponding to a specific input.

For each input instance provisioned to a trained and deployed computer model, such as a DL model, a trusted execution environment (TEE) is leveraged to faithfully record and log its associated neural flows for its execution pass and send the attestation report to the tenants. On the tenant side, the user maintains a measurement database that stores the pre-recorded neural flows for all the training data in different classes, i.e. potential classification outputs of the DL model. Based on the prediction result, i.e. the classification output generated by the DL model in the cloud computing environment, the tenant can verify whether the neural flows recorded in the cloud deviate from the training data's neural flows in the same class for their DL model. If the DL model in the cloud computing environment deviates from the training data's neural flows, or deviates more than a predetermined amount as indicated by one or more pre-defined criteria, this may be regarded as an anomalous neural flow, which indicates that the DL model in the cloud computing environment may have been compromised and needs to be retracted for further investigation. Thus, the illustrative embodiments allow the cloud platform providers to attest the runtime execution status to their tenants and allows the tenants to verify the status of their online DL models with their locally-resident measurement database.

With the illustrative embodiments, it is assumed that a cloud computing environment user, i.e. an entity that owns a computer model, such as a DL model, who wishes to deploy the computer model to the cloud computing environment, has trained their model using their own training data, such as part of an offline pre-processing operation. The user (model owning entity; also referred to as a "tenant" in the context of cloud computing platforms) intends to provision the model to a model serving cloud platform provider to instantiate an online cloud service, e.g., an online classification or prediction service using machine learning trained computer models, such as a DL model. For example, the user may be intending to instantiate a facial recognition classification service, a healthcare decision support service, or any of a plethora of other services that utilize artificial intelligence based computer models, such as DL models, to perform classification operations, prediction operations, or the like.

After training the model, the user passes the training data into the trained model again with a neural flow extraction engine of the illustrative embodiments operating to extract neuron activation information at each layer of the trained model. The neuron activation information may have different content based on the particular layer types of the computer model. For a convolutional layer, for example, each filter within the layer is considered a unit and the average activation value for each filter is computed as part of the neuron activation information. For a fully-connected layer, each neuron is considered a unit and its activation value is extracted. For each layer, a threshold value may be predetermined and only the identities and activation values of filters/neurons that meet criterion associated with the threshold are recorded, e.g., only the activation values of filters/neurons that meet or exceed the threshold value are recorded.

The neural flow extraction engine combines the neuron activations across the layers to thereby generate the neural flows of each training data instance. A neural flow aggregation engine aggregates the neural flows for all training data within a same class and generates a neural flow model respectively for each class. The neural flow models are stored in a measurement database at the tenant's local computing system for later use in comparing to neural flows generated at a remotely located cloud deployment of the computer model.

After training the model and storing the neural flow models for each of the classes of output generated by the model as described above, the user may deploy the computer model to the cloud platform provider's cloud computing environment and initiate the cloud service corresponding to the deployed computer model, e.g., trained DL model. In addition, a trusted execution environment (TEE) is generated or launched on the cloud computing environment. The TEE is an isolated execution environment of the computing resources of the cloud computing platform that provides security features such as isolated execution, integrity of applications executing within the TEE, and confidentiality of computing assets maintained within the TEE. With a TEE, code may be executed within the TEE with a high level of trust because the TEE can ignore threats from the rest of the cloud computing platform outside the TEE. The creation and use of TEEs is generally known in the art and thus, a more detailed explanation is not provided herein.

Within the TEE, one or more recording components are provided to intercept the deployed model's execution and obtain the neural flow information for each input to the executing model. That is, the model, e.g., DL model, executes outside the TEE, however, a recording component, such as another instance of the neural flow extraction engine discussed above, executes within the TEE. When the model receives an input for classification, prediction, etc., the recording component within the TEE captures the neural flow for the input by again extracting neuron activation information at each layer of the deployed model and combining the neuron activations across the layers to thereby generate the neural flow of the deployed model when processing the input. It should be appreciated that the model itself does not need to be modified for the mechanisms within the TEE to capture the neural flow information. The recording mechanisms are added in the deep learning online execution framework. Once the model begins to execute for a specific input data instance, the execution at each layer is intercepted by the recording mechanisms when the input is passed through the model. At each interception, the recording mechanism enclosed inside the TEE is invoked to extract the activation information. Thereafter, all activation information collected across all layers is combined to build a neural flow for this input data instance.

The captured neural flow information may be stored within a secure storage of the TEE and provided back to the user's local computing system, e.g., a tenant's local computing system or computing device. For example, when a user sends an input instance for processing by the deployed model, the user may associate with this input a specific challenge C for freshness testing. The challenge is used to defend against "replay attacks." That is, the challenge C helps to make sure that the returned neural flow is not replaced by the computing platform provider with a previously crafted or prepared version of the neural flow. Thus, for each input, the user, or cloud tenant in the case of a cloud computing platform, sends a randomly or pseudo-randomly generated challenge C to the recording component. This challenge can only be used within the TEE and the computing platform provider cannot access the challenge C. This challenge is associated with the recorded neural flow associated with the input. When the user (or cloud tenant) receives the neural flow, the user/cloud tenant can verify the neural flow's integrity and freshness based on this challenge C.

For example, within the TEE, the neural flow for the input is captured along with information regarding the input and model's output, and hashed with the challenge C, and the attested neural flow, or "attestation," is encrypted using a security key that may be exchanged between the user or tenant, computing system/device and the TEE as part of the launching of the TEE. The exchanged security key is used to encrypt the data exchanged between the TEE and the user or tenant computing system/device, such as the packed recorded neural flow, the input/output of the computer model, and the hash with the challenge C, to thereby generate a sealed attestation.

When the sealed attestation is received from the TEE of the cloud computing platform at an attestation engine of the user's local computing system, the user can use the challenge C to first verify the integrity and freshness of the attestation and extract the computer model's input/output information and the neural flow corresponding to the processing of the input. Based on the output classification or prediction generated by the model for the input, the attestation engine retrieves, from the local measurement database, a corresponding neural flow model for the particular class that was stored based on the training data during the pre-processing operation described previously. The neural flow in the attestation is compared against the stored neural flow from the measurement database generated by the training data.

If the deployed model is operating as it should, and no modification of the deployed model was performed, either by an attacker, a cloud computing provider, or the like, then the neural flow from the attestation should closely approximate the stored neural flow in the measurement database for the same class. There may be some relatively small discrepancies within a given tolerance, however, overall the neural flows should be the same. If, however, there are appreciable deviations, e.g., deviations greater than the given tolerance, or deviations satisfying criteria indicative of compromise, then the deployed model may have been compromised in some manner, whether innocently or maliciously.

With the illustrative embodiments, deviations between the neural flows may be evaluated, e.g., by application of predefined computer executed rules, comparison against one or more deviation thresholds indicating a degree of acceptable deviation, or the like, to determine if an alert notification is to be triggered to thereby notify the user of a potential compromise of the deployed model. If the alert notification is triggered, then an alert may be output to the user allowing the user to select whether to automatically retract the deployed model or not. If the user selects to retract the deployed model, a computer command may be transmitted to the cloud computing provider to cause the deployed model to be removed from public access via the cloud computing platform.

Thus, the illustrative embodiments provide mechanisms for performing runtime neural flow attestation of deployed computer model execution, especially with regard to neural networks and deep learning (DL) network computer models. In particular, the runtime neural flow attestation is facilitated by the capturing and comparison of neural flows with regard to the execution of the computer model both at a pre-processing or training stage of operation, and also after deployment of the trained computer model. The runtime neural flow attestation allows for determining if a deployed model has been compromised after deployment so that the model owner can perform appropriate actions for ensuring that their models do not generate unwanted outputs for model users.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a computer executed procedure or methodology, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular features or elements present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As mentioned above, the illustrative embodiments provide mechanisms specifically directed to facilitating runtime neural flow attestation of a deployed machine learning computer model's execution for purposes of ensuring the integrity of the computer model after deployment, such as in a cloud computing environment or other distributed data processing system. The mechanisms of the illustrative embodiments operate both in a local computing system associated with the user (computer model owner) for purposes of capturing neural flows of a trained computer model prior to deployment, and in a remotely located computing system, such as one or more computing systems providing a cloud computing platform, for purposes of capturing neural flows after deployment of the trained computer model for runtime execution. The mechanisms allow for the neural flows of the trained and deployed computer model to be captured using a trusted execution environment and reported back to the user for verification of the neural flows against the stored neural flows captured during a pre-processing or training stage prior to deployment of the trained computer model. Based on this comparison, it may be determined whether the deployed trained computer model has been compromised after training and appropriate action can be performed.

FIG. 1 is an example diagram illustrating a pre-processing or training stage of operation in which neural flow information is gathered for training data used to train a computer model, in accordance with one illustrative embodiment. The operation outlined in FIG. 1 assumes that a deep neural network (DNN), or deep learning (DL) model, 110 (hereafter referred to as a DL model) has been trained using a set of training data 120 and a machine learning training process. Such machine learning training processes are generally known in the art and thus, a detailed explanation of the process of training the DNN or DL model is not provided herein. Suffice it to say that the machine learning training process adjusts operational parameters of the various layers L1-Ln of the DL model 110, such as weights and the like, to cause the DL model 110 to properly classify inputs into one of a plurality of recognizable classes, or to generate a prediction output, for example.

After training the DL model 110, the training data is input again into the now trained DL model 110, as shown in FIG. 1. The neural flow (NF) attestation engine 130 captures and stores the neural flows for the training data and generates neural flow models for the various classes, in the set of recognizable classes, or predictions in the set of potential predictions based on the captured neural flows. For purposes of description, it will be assumed that the DL model 130 is configured to classify inputs into a class of a predetermined set of classifications. In some illustrative embodiments, this classification involves calculating probability values for each of a predetermined number of recognized classes such that a class having a highest probability value, or score, is selected as the output classification for the input. Thus, the output of the DL model 110 may be a vector output with each vector slot corresponding to a different class and a value in the vector slot representing a probability or score indicative of that corresponding class being a correct classification for the input to the DL model 110. The probability values or scores themselves are calculated through operation of the various neurons of the layers L1-LN of the DL model 110.

The neural flow extraction engine 132 of the neural flow (NF) attestation engine 130 extracts neuron activation information at each layer L1-LN of the trained DL model 110. The neural flow extraction engine 132 combines the neuron activations (e.g., shown as darkened vector slots in the neural flow in FIG. 1) across the layers L1-LN to thereby generate the neural flows 134 of each training data instance in the training data 120. Thus, when the trained DL model 110 processes a training data instance as input to the DL model 110, the DL model 110 generates neuron activation information that is captured by the NF extraction engine 132 and correlated with the output classification generated by the DL model 110. Thus, as each training data instance is processed, a corresponding neural flow 134 and output classification is generated for the training data instance and stored by the NF attestation engine 130 for processing by the NF aggregation engine 136.

The NF aggregation engine 136 aggregates the neural flows 134 for all training data classified within a same class and generates a neural flow model 140 respectively for each class. For example, if the DL model 110 is trained to classify inputs into one of 100 different recognizable classes, for each of the 100 classes, a corresponding neural flow model 140 is generated by aggregating the neural flows 134 of training data instances that were classified into the corresponding class, i.e. in this example, there would be 100 neural flow models 140 generated. The aggregation of the neural flows 134 may be performed in any of a number of different ways without departing from the spirit and scope of the present invention. For example, in one illustrative embodiment, the "set" of activated neurons and filters (depending on the layer being a convolutional layer and fully-connected layer) of all training data in the same class may be identified. In other illustrative embodiments, a machine learning model, e.g., a Bayesian model, an SVM model, or a graph neural network model, may be trained based on the activated neurons and filters. The machine learning model can take the order of activations and frequency of activation occurrence into account. As a result, approximated similarity match for unseen testing data at runtime can be conducted.

The neural flow models 140 are stored in a measurement database 150 in association with an indicator of the corresponding class to which the neural flow models 140 correspond. Thus, when verifying a deployed model's execution using neural flows, a corresponding neural flow model 140 may be retrieved from the measurement database 150 for a particular class and used to perform model integrity verification, such as by the neural flow verification engine 138 as described hereafter.

Figure 2:
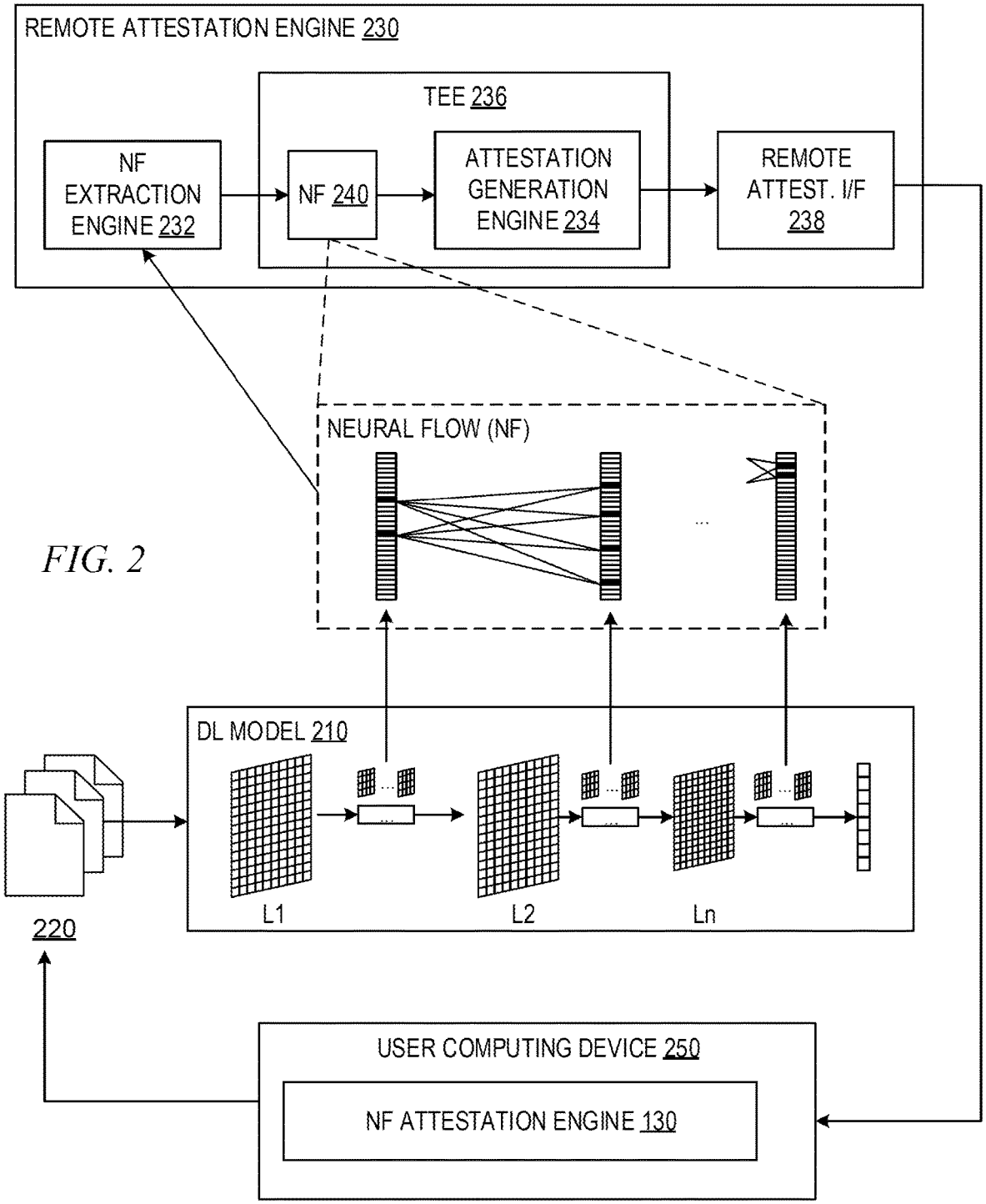
FIG. 2 is an example diagram illustrating a deployment stage of operation in which runtime neural flow attestation of the operation of a deployed computer model is performed in accordance with one illustrative embodiment.

After training the DL model 110 and storing the neural flow models 140 for each of the classes of output generated by the DL model 110 in the measurement database 150 as described above, the user may deploy the trained DL model 110 to a cloud platform provider's cloud computing environment and initiate the cloud service corresponding to the deployed DL model. FIG. 2 is an example diagram illustrating a deployment stage of operation in which runtime neural flow attestation of the operation of a deployed DL model 210 is performed in accordance with one illustrative embodiment. In FIG. 2, the right hand side of the figure, labeled "cloud," refers to the cloud computing platform and cloud computing environment in which the DL model 210 is deployed and executed with regard to new inputs 220 received from users of the cloud services that the DL model 210 supports. For example, the "cloud" side of the figure may be a particular portion of cloud computing resources (hardware and/or software) that are apportioned to the DL model 210 owner, such as part of a multi-tenant cloud computing environment.

As shown in FIG. 2, the cloud computing platform provides a NF runtime neural flow attestation engine 230 and trusted execution environment (TEE) 236 for the deployment of the DL model 210. In some illustrative embodiments, the NF runtime neural flow attestation engine 230, or a subset of components of the NF runtime neural flow attestation engine 230, may execute within the TEE 236, or the TEE 236 may be provided as a part of the NF runtime neural flow attestation engine 230. For ease of depiction, however, the runtime neural flow attestation engine 230 is shown as external to the TEE 236, however this is not a requirement of the present invention. Of particular note, however, is that the deployed trained DL model 210 does execute outside the TEE 236 while the capture, storage, and reporting of the neural flows of the deployed trained DL model 210 are performed within the TEE 236 to ensure that the recorded neural flows are not tampered with.

As shown in FIG. 2, the NF runtime neural flow attestation engine 230 comprises a NF extraction engine 232 that operates to record the neural flows (NFs) of the DL model 210 operating on the inputs 220. The NF extraction engine 232 may operate in a similar manner as the NF extraction engine 132 of FIG. 1, but executes in the cloud computing platform with regard to the deployed trained DL model 210. In some illustrative embodiments, the NF extraction engine 232 executes within the TEE 236 to collect neural flow information, referred to as attested neural flow information since it is used to attest the proper execution of the deployed trained DL model 210.

The NF runtime neural flow attestation engine 230 further comprises an attestation generation engine 234 that generates an attestation output that is sent to the user's local computing system, such as shown in FIG. 1, for verification by the NF attestation engine 130. The data communication between the NF runtime neural flow attestation engine 230 in FIG. 2 and the NF attestation engine 130 in FIG. 1 is facilitated via the runtime neural flow attestation interfaces 137 and 238 of the respective computing system(s) or platform(s).

As shown in FIG. 2, when the deployed trained DL model 210 receives an input 220 for processing, such as classification, prediction, etc., the NF extraction engine 232, which may execute within the TEE 236, captures and stores the neural flow 240 for the input 220 by again extracting neuron activation information at each layer L1-LN of the deployed trained DL model 210 and combining the neuron activations across the layers L1-LN to thereby generate the neural flow 240 of the deployed trained DL model 210. The captured neural flow information 240 may be stored within a secure storage of the TEE 236 and provided back to the NF attestation engine 130 executing on the user's local computing system.

For example, when a user computing system 250 sends an input 220 for processing by the deployed trained DL model 210, the user computing system 250 may associate with this input a specific challenge C for use in determining freshness of the attestation received from the NF runtime neural flow attestation engine 230. Within the TEE 236, the neural flow 240 for that input 220 is captured by the NF extraction engine 232 along with information regarding the model's output. The extracted NF and the model output, i.e. the class in which the input is classified, are provided to the attestation generation engine 234 along with the challenge C. The attestation generation engine 234 hashes the NF and model output with the challenge C, and may encrypt the result, with a security key exchanged between the user/tenant computing device and the TEE as part of the TEE launch, to thereby seal the data and generate the attestation which is then transmitted back to the user computing device 250 implementing the NF attestation engine 130. Alternatively, in some illustrative embodiments, the NF attestation engine 130 may be provided on a separate computing device from the user computing device 250 as long as the separate computing device is also provided with the challenge so that the sealed attestation can be accessed and verified.

When the sealed attestation is received from the TEE 236 at the NF attestation engine 130 of the user's local computing system, e.g., user computing device 250 via the interfaces 137 and 238, the neural flow verification engine 138 of the NF attestation engine 130 (see FIG. 1) executing on the user computer device 250 can use the challenge C to first verify the integrity and freshness of the attestation and extract the DL model's output information and the neural flow corresponding to the processing of the input 220. Based on the output classification or prediction generated by the DL model 210 for the input 220, the neural flow verification engine 138 retrieves, from the local measurement database 150, a corresponding neural flow model 140 for the particular class that was stored based on the training data during the pre-processing operation described previously with regard to FIG. 1. The neural flow 240 in the attestation is compared against the stored neural flow of the neural flow model 140 from the measurement database 150 generated by the training data.

As mentioned previously, if the deployed trained DL model 210 is operating as it should, and no modification of the deployed trained DL model 210 was performed, either by an attacker, a cloud computing provider, or the like, then the neural flow 240 from the attestation should closely approximate the stored neural flow 140 in the measurement database 150 for the same class. If, however, there are appreciable deviations, e.g., deviations greater than the given tolerance, or deviations satisfying criteria indicative of compromise, such as specified in one or more computer applied rules, then the deployed trained DL model 210 may have been compromised in some manner, whether innocently or maliciously, after the training of the DL model 110 and deployment.

With the illustrative embodiments, deviations between the neural flows 140, 240 may be evaluated by the neural flow verification engine 138, e.g., by application of predefined computer executed rules, comparison against one or more deviation thresholds indicating a degree of acceptable deviation, or the like, to determine if criteria or thresholds are satisfied indicating potential compromise of the deployed trained DL model 210. An alert notification is to be triggered to thereby notify the user of a potential compromise of the deployed model. If such criteria or thresholds are met, then an alert notification is triggered, and the notification and responsive action engine 139 is invoked to compose and transmit, or otherwise output, an alert to/on the user computing device 250 allowing the user to select whether to automatically retract the deployed trained DL model 210 or not. If the user selects to retract the deployed trained DL model 210, a computer command may be transmitted to the cloud computing provider to cause the deployed trained DL model 210 to be removed from public access, e.g., de-registered from available cloud services on the cloud computing platform.

Thus, mechanisms are provided for performing runtime neural flow attestation of deployed computer model execution. The runtime neural flow attestation involves capturing and comparing neural flows of the computer model both at a pre-processing or training stage of operation, and also after deployment of the trained computer model. The runtime neural flow attestation allows for determining if a deployed model has been compromised after deployment so that the model owner can perform appropriate actions for ensuring that their models do not generate unwanted outputs for model users. Moreover, the runtime neural flow attestation addresses the three concerns that tenants have regarding their deployed DL models as noted above. For example, with regard to attackers injecting backdoors into the deployed trained DL model, if the attacker causes the DL model to misclassify an input, the neural flow will be modified to cause such misclassification and such modification of the neural flow will be detected by the mechanisms of the illustrative embodiments. If a cloud computing platform provider prunes or "squeezes" the DL model to reduce storage and computation costs, again the neural flow will be modified and such deviations from the trained DL model prior to deployment will be detected by the mechanisms of the illustrative embodiments. In addition, if the DL model is subjected to adversarial attacks, this will also cause a deviation in the neural flow which is detected by the mechanisms of the illustrative embodiments. Thus, the claimed invention, using a neural flow based runtime neural flow attestation model, provides mechanisms for verifying the integrity of a deployed trained DL model and detection of potential compromise from attackers or cloud computing platform providers.

Figure 3:
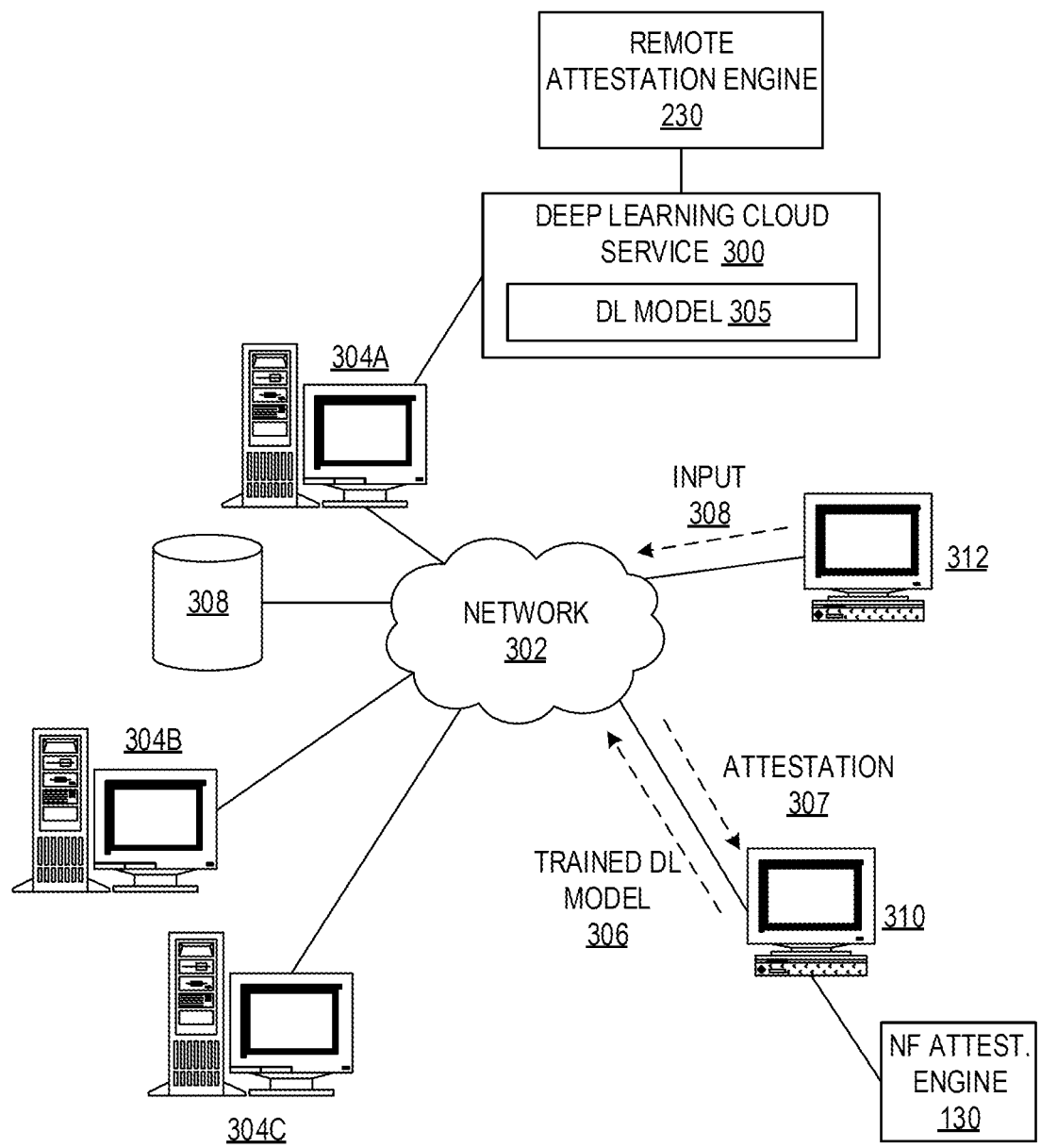
FIG. 3 depicts a pictorial representation of an example distributed data processing system in which aspects of the illustrative embodiments may be implemented.
Figure 4:
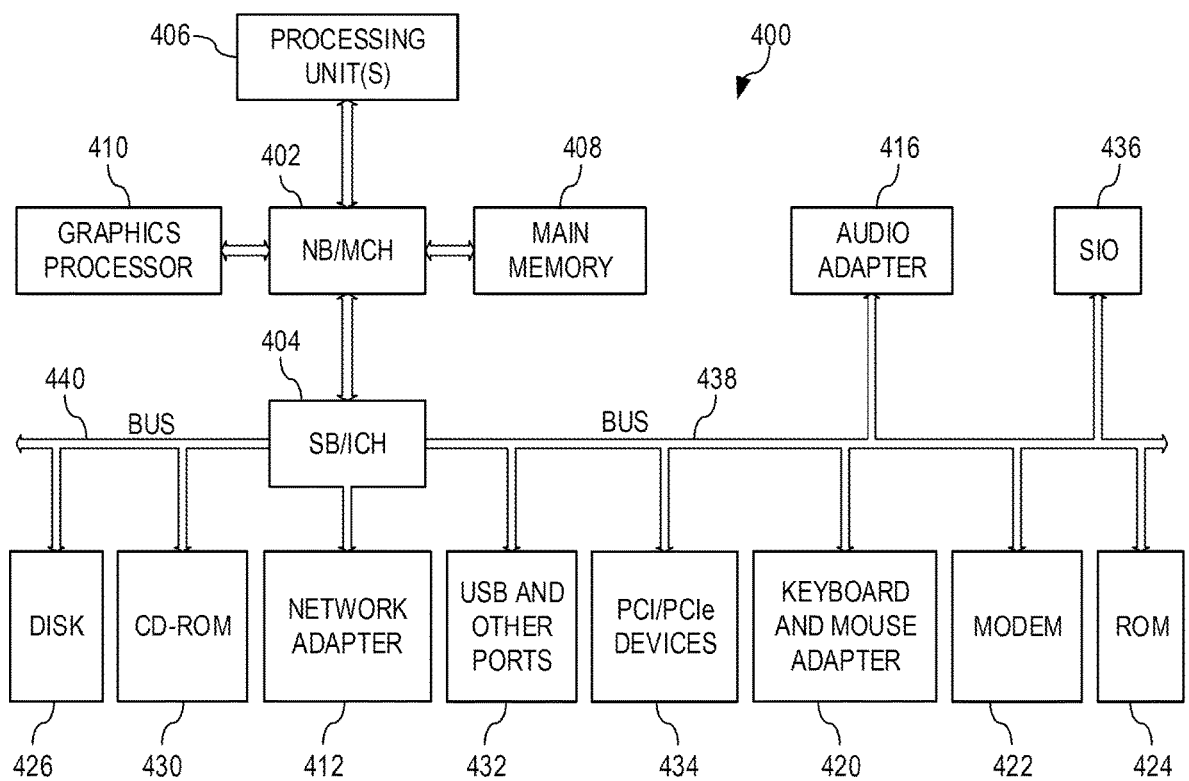
FIG. 4 is a block diagram of an example computing device in which aspects of the illustrative embodiments may be implemented.

As is apparent from the above description, the present invention provides a computer tool for improving the integrity of deployed computer models, especially in cloud computing or other distributed data processing system environments, and for detecting compromise of such deployed computer models so that appropriate notification and responsive actions can be performed. Thus, the illustrative embodiments may be utilized in many different types of data processing environments. In order to provide a context for the description of the specific elements and functionality of the illustrative embodiments, FIGS. 3 and 4 are provided hereafter as example environments in which aspects of the illustrative embodiments may be implemented. It should be appreciated that FIGS. 3 and 4 are only examples and are not intended to assert or imply any limitation with regard to the environments in which aspects or embodiments of the present invention may be implemented. Many modifications to the depicted environments may be made without departing from the spirit and scope of the present invention.

FIG. 3 depicts a pictorial representation of an example distributed data processing system in which aspects of the illustrative embodiments may be implemented. Distributed data processing system 300 may include a network of computers in which aspects of the illustrative embodiments may be implemented. The distributed data processing system 300 contains at least one network 302, which is the medium used to provide communication links between various devices and computers connected together within distributed data processing system 300. The network 302 may include connections, such as wire, wireless communication links, satellite communication links, fiber optic cables, or the like.

In the depicted example, servers 304A-304C are connected to network 302 along with storage unit 308. In addition, clients 310 and 312 are also connected to network 302. These clients 310 and 312 may be, for example, personal computers, network computers, or the like. In the depicted example, servers 304A-304C provide data, such as boot files, operating system images, and applications to the clients 310-312. Clients 310-312 are clients to a cloud computing system comprising server 304A, and possibly one or more of the other server computing devices 304B-304C, in the depicted example. Distributed data processing system 300 may include additional servers, clients, and other computing, data storage, and communication devices not shown.

In the depicted example, distributed data processing system 300 is the Internet with network 302 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 300 may also be implemented to include a number of different types of networks, such as for example, an intranet, a local area network (LAN), a wide area network (WAN), or the like. As stated above, FIG. 3 is intended as an example, not as an architectural limitation for different embodiments of the present invention, and therefore, the particular elements shown in FIG. 3 should not be considered limiting with regard to the environments in which the illustrative embodiments of the present invention may be implemented.

As shown in FIG. 3, in accordance with one illustrative embodiment, one or more of the computing devices, e.g., server 304A, may be specifically configured to implement a deep learning cloud service platform 300 which is further configure with a runtime neural flow attestation engine 230, such as that shown in FIG. 2, with which the DL cloud service platform 300 operates. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 304A, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described herein, the implementation of the mechanisms of the illustrative embodiments improves the functionality of the computing device and provides a useful and concrete result that facilitates runtime neural flow attestation of the integrity of a deployed trained computer model based on the neural flows of the computer model.

As shown in FIG. 3, one or more of the servers 304A-304C are configured to implement the deep learning cloud service 300 and runtime neural flow attestation engine 230. While FIG. 3 shows elements 300 and 230 being associated with a single server, i.e. server 304A, it should be appreciated that a plurality of servers, e.g., 304A-304C, may together constitute a cloud computing system and be configured to provide the deep learning cloud service 300 and runtime neural flow attestation engine 230 such that the mechanisms of the deep learning cloud service 300 and the runtime neural flow attestation engine 230, or portions thereof, and the DL computing model 305 deployed to the DL cloud service 300, or portions thereof, may be distributed across multiple server computing devices 304A-304C. In some illustrative embodiments, multiple instances of the deep learning cloud service 300, DL model 305, and runtime neural flow attestation engine 230 may be provided on multiple different servers 304A-304C of the cloud computing system. The deep learning cloud service 300 may provide any deep learning or AI based functionality of a deep learning system.

In some illustrative embodiments, the deep learning cloud service 300 may implement a cognitive computing system (cognitive system). As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. A cognitive system performs one or more computer-implemented cognitive operations that approximate a human thought process as well as enable people and machines to interact in a more natural manner so as to extend and magnify human expertise and cognition. A cognitive system comprises artificial intelligence logic, such as natural language processing (NLP) based logic, image analysis and classification logic, electronic medical record analysis logic, etc., for example, and machine learning logic, which may be provided as specialized hardware, software executed on hardware, or any combination of specialized hardware and software executed on hardware. The logic of the cognitive system implements the cognitive operation(s), examples of which include, but are not limited to, question answering, identification of related concepts within different portions of content in a corpus, image analysis and classification operations, intelligent search algorithms such as Internet web page searches, for example, medical diagnostic and treatment recommendations and other types of recommendation generation, e.g., items of interest to a particular user, potential new contact recommendations, or the like. In some illustrative embodiments the deep learning (DL) cloud service 300 may provide functionality, based on the operation of the deployed trained DL models 305, for performing other cognitive operations such as image recognition and analysis, facial recognition, or the like. In general, the DL model 305 deployed to the DL cloud service 300 may provide classification and/or prediction functionality upon which further evaluations by the DL cloud service 300 may be performed, for example.

IBM Watson™ is an example of one such cognitive system which can process human readable language and identify inferences between text passages with human-like high accuracy at speeds far faster than human beings and on a larger scale. In general, such cognitive systems are able to perform the following functions: navigate the complexities of human language and understanding; Ingest and process vast amounts of structured and unstructured data; generate and evaluate hypothesis; weigh and evaluate responses that are based only on relevant evidence; provide situation-specific advice, insights, and guidance; improve knowledge and learn with each iteration and interaction through machine learning processes; enable decision making at the point of impact (contextual guidance); scale in proportion to the task; Extend and magnify human expertise and cognition; identify resonating, human-like attributes and traits from natural language; deduce various language specific or agnostic attributes from natural language; high degree of relevant recollection from data points (images, text, voice) (memorization and recall); predict and sense with situational awareness that mimic human cognition based on experiences; and answer questions based on natural language and specific evidence.

In one illustrative embodiment, a cognitive system, which may be implemented as a deep learning cloud service 300, provides mechanisms for answering questions or processing requests from client computing devices, such as client computing device 310, via one or more processing pipelines implementing one or more DL models 305. In other illustrative embodiments, the cognitive system provides an image analysis and recognition capability based on the one or more processing pipelines implementing one or more DL models 305. In either case, the one or more DL models 305 perform classification or prediction operations and the neural flows of the DL model(s) 305 are monitored, captured and reported to the model owners (users) to attest to the integrity of the deployed and trained DL models 305.

The one or more processing pipelines with which the DL model(s) 305 operate are artificial intelligence applications executing on data processing hardware that respond to requests with results generated based on a cognitive evaluation of inputs and other evidential data based on the trained DL model(s) 305, e.g., answers questions pertaining to a given subject-matter domain presented in natural language or processes requests to perform a cognitive operation on input data which may be presented in natural language or as a structured request/query, analyzes a given image to classify objects in the image and provide a classification result, etc.

As shown in FIG. 3, a client computing system, e.g., client computing system 310 is configured to implement a neural flow attestation engine 130, such as shown in FIG. 1, which operates as previously described to create the neural flow models for a trained DL model 306 that is deployed to the DL cloud service 300 as deployed trained DL model 305 that operates within the DL cloud service 300 to service user inputs, such as input 308 from computing device 312. The NF attestation engine 130 further operates as described previously to verify the integrity of the deployed trained DL model 305 using the created and stored NF models for the trained DL model 306 based on the attestation 307 received from the runtime neural flow attestation engine 230 operating on server 304A in conjunction with DL cloud service 300 and deployed trained DL model 305. That is, the runtime neural flow attestation engine 230 operates as described previously to capture a neural flow of the deployed trained DL model 305 within a trusted execution environment and generate an attestation 307 based on the captured neural flow which is transmitted to the deployed trained DL model 305 owner computing system 310 for runtime neural flow attestation of the integrity of the deployed trained DL model 305.

In addition, the NF attestation engine 130 may operate to retrieve a stored NF model, such as may be stored in the measurement database 150 in FIG. 1, for the trained DL model 306 and the classification output generated by the deployed trained DL model 305 of the input 308 as specified in the attestation 307. The NF attestation engine 130 further operates to determine whether discrepancies between the NF in the attestation 307 and the retrieved NF model are indicative of a potential compromise of the deployed trained DL model 305. In addition, the NF attestation engine 130 may generate an alert and transmit/output the alert to an authorized user to inform them of the potential compromise. Furthermore, the NF attestation engine 130 may automatically send commands to the cloud computing service platform provider, e.g., to server 304A, to cause the deployed trained DL model 305 to be retracted, or de-registered as accessible via the DL cloud service 300, in response to a determination that the discrepancies are indicative of a potential compromise. This may be done in response to a user input requesting such retraction of the deployed trained DL model 305.

As noted above, the mechanisms of the illustrative embodiments utilize specifically configured computing devices, or data processing systems, to perform the operations for performing runtime neural flow attestation of the integrity of a deployed trained computer model. These computing devices, or data processing systems, may comprise various hardware elements which are specifically configured, either through hardware configuration, software configuration, or a combination of hardware and software configuration, to implement one or more of the systems and/or subsystems described herein. FIG. 4 is a block diagram of just one example data processing system in which aspects of the illustrative embodiments may be implemented. Data processing system 400 is an example of a computer, such as server 304A or client computing device 310 in FIG. 3, in which computer usable code or instructions implementing the processes and aspects of the illustrative embodiments of the present invention may be located and/or executed so as to achieve the operation, output, and external effects of the illustrative embodiments as described herein.

In the depicted example, data processing system 400 employs a hub architecture including north bridge and memory controller hub (NB/MCH) 402 and south bridge and input/output (I/O) controller hub (SB/ICH) 404. Processing unit 406, main memory 408, and graphics processor 410 are connected to NB/MCH 402. Graphics processor 410 may be connected to NB/MCH 402 through an accelerated graphics port (AGP).

In the depicted example, local area network (LAN) adapter 412 connects to SB/ICH 404. Audio adapter 416, keyboard and mouse adapter 420, modem 422, read only memory (ROM) 424, hard disk drive (HDD) 426, CD-ROM drive 430, universal serial bus (USB) ports and other communication ports 432, and PCI/PCIe devices 434 connect to SB/ICH 404 through bus 438 and bus 440. PCI/PCIe devices may include, for example, Ethernet adapters, add-in cards, and PC cards for notebook computers. PCI uses a card bus controller, while PCIe does not. ROM 424 may be, for example, a flash basic input/output system (BIOS).

HDD 426 and CD-ROM drive 430 connect to SB/ICH 404 through bus 440. HDD 426 and CD-ROM drive 430 may use, for example, an integrated drive electronics (IDE) or serial advanced technology attachment (SATA) interface. Super I/O (SIO) device 436 may be connected to SB/ICH 404.

An operating system runs on processing unit 406. The operating system coordinates and provides control of various components within the data processing system 400 in FIG. 4. As a client, the operating system may be a commercially available operating system such as Microsoft® Windows 10®. An object-oriented programming system, such as the Java™ programming system, may run in conjunction with the operating system and provides calls to the operating system from Java™ programs or applications executing on data processing system 400.

As a server, data processing system 400 may be, for example, an IBM eServer™ System p® computer system, Power™ processor based computer system, or the like, running the Advanced Interactive Executive (AIX®) operating system or the LINUX® operating system. Data processing system 400 may be a symmetric multiprocessor (SMP) system including a plurality of processors in processing unit 406. Alternatively, a single processor system may be employed.

Instructions for the operating system, the object-oriented programming system, and applications or programs are located on storage devices, such as HDD 426, and may be loaded into main memory 408 for execution by processing unit 406. The processes for illustrative embodiments of the present invention may be performed by processing unit 406 using computer usable program code, which may be located in a memory such as, for example, main memory 408, ROM 424, or in one or more peripheral devices 426 and 430, for example.

A bus system, such as bus 438 or bus 440 as shown in FIG. 4, may be comprised of one or more buses. Of course, the bus system may be implemented using any type of communication fabric or architecture that provides for a transfer of data between different components or devices attached to the fabric or architecture. A communication unit, such as modem 422 or network adapter 412 of FIG. 4, may include one or more devices used to transmit and receive data. A memory may be, for example, main memory 408, ROM 424, or a cache such as found in NB/MCH 402 in FIG. 4.

As mentioned above, in some illustrative embodiments the mechanisms of the illustrative embodiments may be implemented as application specific hardware, firmware, or the like, application software stored in a storage device, such as HDD 426 and loaded into memory, such as main memory 408, for executed by one or more hardware processors, such as processing unit 406, or the like. As such, the computing device shown in FIG. 4 becomes specifically configured to implement the mechanisms of the illustrative embodiments and specifically configured to perform the operations and generate the outputs described herein with regard to the deep learning cloud service implementing the privacy enhancing deep learning cloud service framework and one or more processing pipelines.

Those of ordinary skill in the art will appreciate that the hardware in FIGS. 3 and 4 may vary depending on the implementation. Other internal hardware or peripheral devices, such as flash memory, equivalent non-volatile memory, or optical disk drives and the like, may be used in addition to or in place of the hardware depicted in FIGS. 3 and 4. Also, the processes of the illustrative embodiments may be applied to a multiprocessor data processing system, other than the SMP system mentioned previously, without departing from the spirit and scope of the present invention.

Moreover, the data processing system 400 may take the form of any of a number of different data processing systems including client computing devices, server computing devices, a tablet computer, laptop computer, telephone or other communication device, a personal digital assistant (PDA), or the like. In some illustrative examples, data processing system 400 may be a portable computing device that is configured with flash memory to provide non-volatile memory for storing operating system files and/or user-generated data, for example. Essentially, data processing system 400 may be any known or later developed data processing system without architectural limitation.

Figure 5:
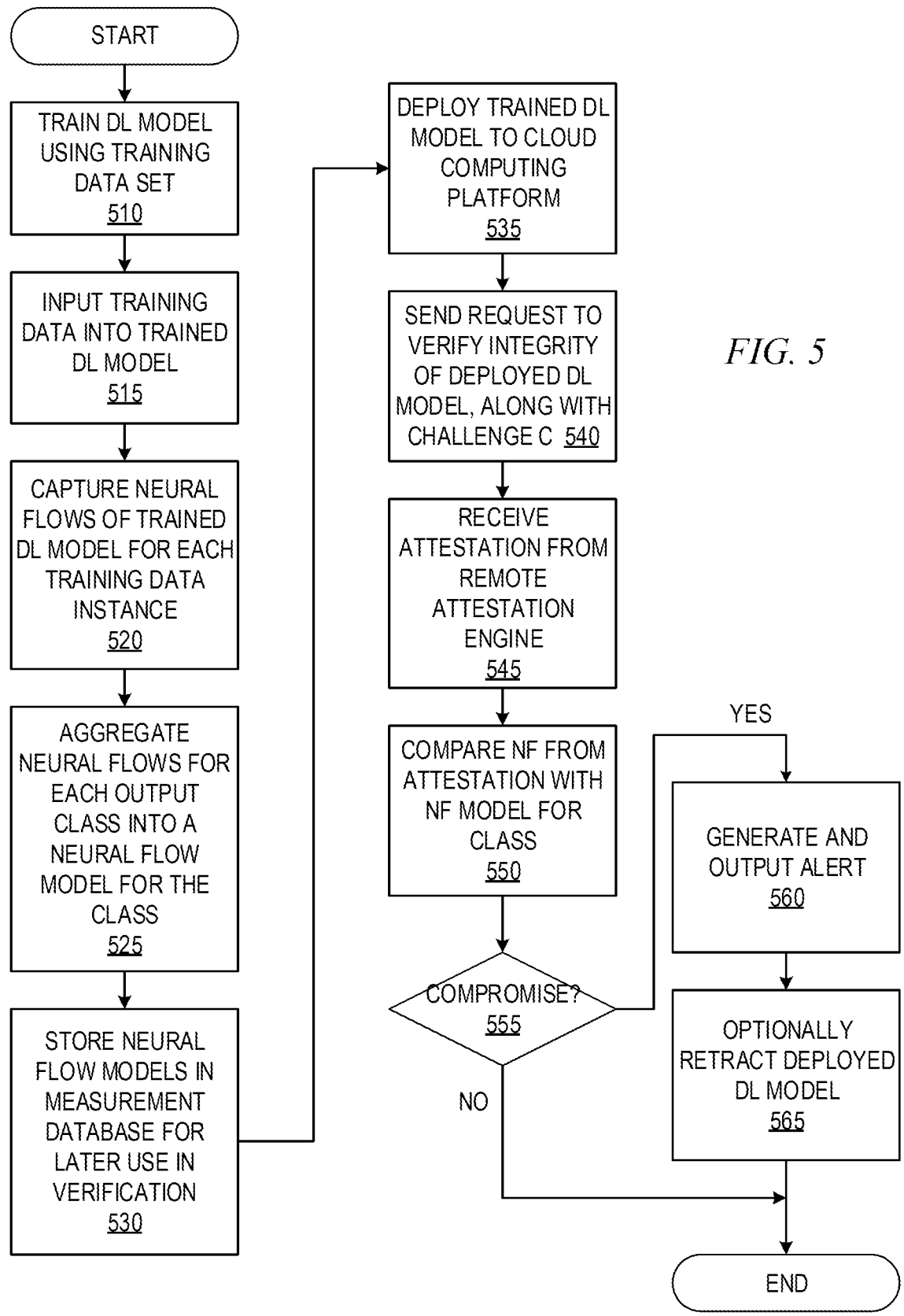
FIG. 5 is a flowchart outlining an example operation for performing the pre-processing stage functions in accordance with one illustrative embodiment.

FIG. 5 is a flowchart outlining an example operation for performing the pre-processing stage functions in accordance with one illustrative embodiment. As shown in FIG. 5, the operation starts by training a DL model using a training data set (step 510). After having trained the DL model, the training data is again input to the trained DL model (step 515) so that the neural flows of the trained DL model for each training data instance can be captured (step 520). The captured neural flows are then aggregated for each output class of the trained DL model, such that the aggregation for a class is a neural flow model for that class (step 525). The neural flow models are then stored in a measurement database for later use in verifying the integrity of the deployed trained DL model (step 530).

After having trained the DL model, having captured the neural flows of the trained DL model, and having generated and stored the neural flow models for the various classes, the trained DL model is deployed to a cloud computing platform (step 535). At some time later, the user, via a computing system, may send a request to the cloud computing platform to verify the integrity of the deployed DL model (step 540). The request may include a challenge C which is used to seal or secure the attestation that is returned from the runtime neural flow attestation engine operating in the cloud computing platform.

In response to the request, the runtime neural flow attestation engine at the cloud computing platform generates an attestation which is then received by the NF attestation engine (step 545). The attestation comprises the neural flow captured by the runtime neural flow attestation engine along with an output class generated by the deployed trained DL model for the input submitted with the request. The NF attestation engine retrieves the corresponding stored neural flow model for the output class and compares the neural flow in the attestation with the retrieved neural flow model for that output class (step 550). A determination is made as to whether the comparison satisfies criteria indicative of a potential compromise of the deployed trained DL model (step 555). For example, computer executable rules, thresholds, or the like, may be applied to discrepancies between the neural flow in the attestation and the neural flow model to determine if the discrepancies are indicative of compromise.

If the comparison generates a result that there is no compromise, the operation terminates. Otherwise, if the comparison generates a result that there is a potential compromise, an alert is generated and output to an authorized user (step 560). Optionally, the deployed trained DL model may be retracted (step 565). The retraction of the deployed trained DL model may be performed after having alerted the authorized user and requesting the authorized user to confirm a need to retract the deployed trained DL model. The operation then terminates.

Figure 6:
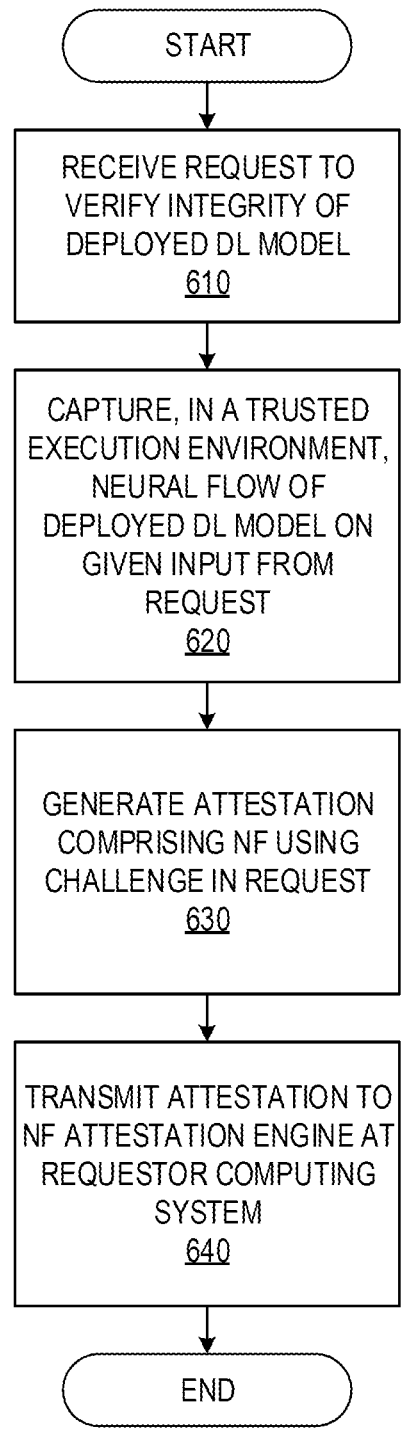
FIG. 6 is a flowchart outlining an example operation for performing the deployment stage functions, including run-time neural flow attestation of neural flows, in accordance with one illustrative embodiment.

FIG. 6 is a flowchart outlining an example operation for performing the deployment stage functions, including runtime neural flow attestation of neural flows, in accordance with one illustrative embodiment. The operation outlined in FIG. 6 assumes that a trained DL model has already been provided to the cloud computing platform and deployed for use.

As shown in FIG. 6, the operation starts by receiving a request to verify the execution integrity of the deployed DL model (step 610). As discussed above, this request may be accompanied with input data that is to be processed by the deployed DL model to generate an output classification, and may further include a challenge C for integrity verification and freshness testing. In some embodiments, a security key may also be exchanged for use in encrypting or sealing attestations generated by the trusted execution environment as previously described above. In response to the request, in a trusted execution environment of the cloud computing platform, the neural flow of the deployed DL model is captured based on the given input (step 620). Based on the captured neural flow, the output classification, and the challenge C, an attestation is generated for responding to the request (step 630). The attestation is then transmitted to the NF attestation engine at the requestor computing system for verification of the runtime execution integrity of the deployed DL model based on the neural flows (step 640). The operation then terminates.

Thus, the illustrative embodiments provide mechanisms for ensuring the integrity of deployed trained computer models by providing a runtime neural flow attestation capability based on the neural flows within the computer model. The illustrative embodiments record the neural flow models prior to the deployment of the computer model and use this as a basis for verifying attestations from the cloud computing platform after the trained computer model is deployed as part of a cloud computing service. Thus, a user (owner of the trained computer model) may determine whether or not their trained computer model is compromised, whether innocently or maliciously, after the user provides the trained computer model for deployment on the cloud computing platform. As a result, the user is able to take responsive action, such as retracting the deployed computer model, to ensure that users are not relying on a compromised computer model.

Embodiments of the present invention are capable of being implemented in conjunction with any type of computing environment now known or later developed. In some illustrative embodiments, the mechanisms of the illustrative embodiments are implemented on cloud computing systems, however implementation of the teachings recited herein are not limited to a cloud computing environment. Various types of distributed data processing system environments may be utilized to implement the mechanisms of the illustrative embodiments.

Assuming a cloud computing embodiment is utilized, it should be appreciated that cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics of a cloud model are as follows:
 (1) On-demand self-service: a cloud consumer can unilaterally provision computing capabilities, such as server time and network storage, as needed automatically without requiring human interaction with the service's provider.
 (2) Broad network access: capabilities are available over a network and accessed through standard mechanisms that promote use by heterogeneous thin or thick client platforms (e.g., mobile phones, laptops, and PDAs).
 (3) Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).
 (4) Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.
 (5) Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:
 (1) Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

(2) Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

(3) Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

(1) Private cloud: the cloud infrastructure is operated solely for an organization. It may be managed by the organization or a third party and may exist on-premises or off-premises.

(2) Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

(3) Public cloud: the cloud infrastructure is made available to the general public or a large industry group and is owned by an organization selling cloud services.

(4) Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
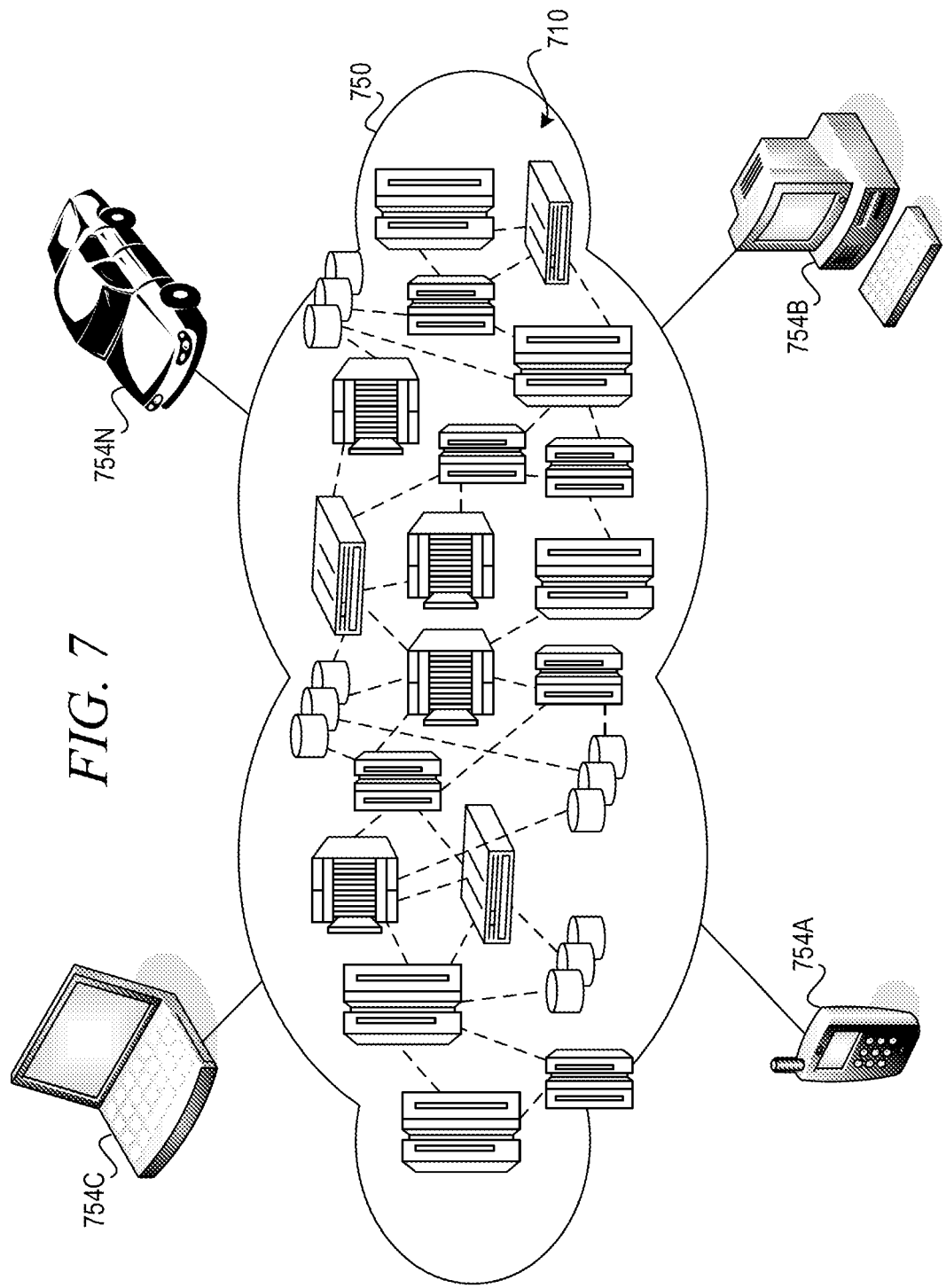
FIG. 7 depicts a cloud computing environment according to an embodiment of the present invention.

Referring now to FIG. 7, illustrative cloud computing environment 750 is depicted. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
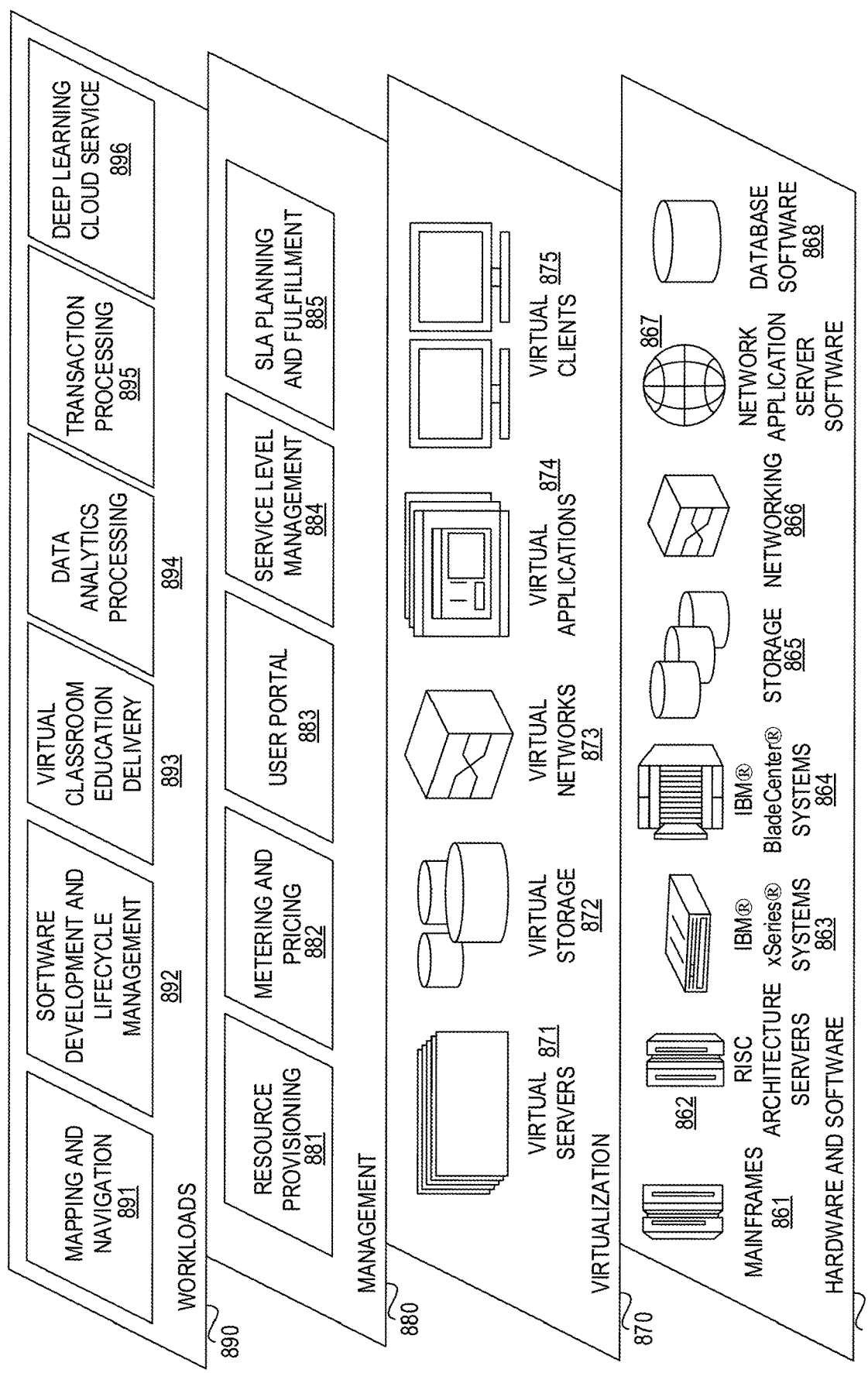
FIG. 8 depicts abstraction model layers according to an embodiment of the present invention.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

(1) Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

(2) Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and deep learning cloud computing service processing 896. The deep learning cloud computing service processing 896 may comprise the pipelines, computer models (e.g., DL models) and runtime neural flow attestation engine mechanisms, such as runtime neural flow attestation engine 230 in FIG. 2, previously described above with regard to one or more of the described illustrative embodiments.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, the at least one memory comprising instructions that are executed by the at least one processor to configure the at least one processor to implement a neural flow attestation engine, the method comprising:
    inputting, by the neural flow attestation engine, input data to a trained computer model, wherein the trained computer model comprises a plurality of layers of neurons;
    recording, by the neural flow attestation engine, for a set of input data instances in the input data processed by the trained computer model, a neural flow through the plurality of layers of neurons, to thereby generate recorded neural flows;
    deploying the trained computer model to a computing platform; and
    verifying, by the neural flow attestation engine, an integrity of the deployed trained computer model based on a runtime neural flow of the deployed trained computer model and the recorded neural flows.

2. The method of claim 1, wherein the trained computer model outputs, for each set of input data instances processed by the trained computer model, an output class that is one of a plurality of possible output classes, the method further comprising:
    generating, by the neural flow attestation engine, for each class in the plurality of possible output classes, a neural flow model based on the recorded neural flows; and
    storing, by the neural flow attestation engine, each neural flow model in a measurement database, wherein verifying the execution integrity of the deployed trained computer model comprises comparing the runtime neural flow to one or more of the stored neural flow models in the measurement database.

3. The method of claim 2, wherein generating, for each class in the plurality of possible output classes, a neural flow model based on the recorded neural flows comprises, for each class, aggregating the recorded neural flows associated with that class by at least one of identifying a set of activated neurons and filters or training a machine learning model based on activated neurons and filters taking into account activations and frequency of activation occurrence.

4. The method of claim 2, wherein the measurement database is stored on a tenant computing device associated with a provider of the trained computer model, and wherein the data processing system is a separate computing system of a cloud computing platform.

5. The method of claim 4, wherein verifying the execution integrity of the deployed trained computer model comprises:
    recording the runtime neural flow of the deployed trained computer model based on runtime input data processed by the deployed trained computer model;
    transmitting, from the data processing system, the recorded runtime neural flow to the tenant computing device; and
    comparing the recorded runtime neural flow with one or more stored neural flow models in the measurement database corresponding to a same class as a runtime output class generated by the deployed trained computer model for the runtime input data.

6. The method of claim 1, wherein verifying the integrity of the deployed trained computer model based on a runtime neural flow of the deployed trained computer model and the recorded neural flows comprises:
    determining deviations between the runtime neural flow and one or more recorded neural flows corresponding to a same output class as generated by the deployed trained computing model for the runtime input data; and
    determining that the execution integrity of the deployed trained computer model has been compromised in response to the deviations satisfying a predetermined criterion.

7. The method of claim 6, further comprising:
    in response to determining that the integrity of the deployed trained computer model has been compromised, retracting the deployed trained computer model from further access by users of the deployed trained computer model.

8. The method of claim 1, wherein recording, for the set of input data instances in the input data, the neural flow through the plurality of layers of neurons comprises:
generating a trusted execution environment (TEE) in the data processing system;
recording, by a neural flow recording component executing within the trusted execution environment, the neural flow through the plurality of layers of neurons for the input data instance; and
generating, by an attestation generation engine executing within the trusted execution environment, an attestation comprising the recorded neural flow through the plurality of layers of neurons for the input data instance and an output class generated by the deployed trained computer model for the input data instance.

9. The method of claim 8, wherein recording, for the set of input data instances in the input data, the neural flow through the plurality of layers of neurons further comprises:
generating, by the attestation generation engine, the attestation further based on a challenge provided by a computing device of a provider of the computer model;
encrypting, by the attestation generation engine, the attestation based on a security key exchanged between the computing device of the provider of the computer model and the TEE, to thereby generate an encrypted attestation; and
transmitting, by the data processing system, the encrypted attestation to the computing device of the provider of the computer model.

10. The method of claim 1, wherein the computing platform is a cloud computing platform having one or more tenants.

11. A computer program product comprising a non-transitory computer readable storage medium having a computer readable program stored therein, wherein the computer readable program, when executed on a data processing system, causes the data processing system to implement a neural flow attestation engine, that performs the operations of:
inputting input data to a trained computer model, wherein the trained computer model comprises a plurality of layers of neurons;
recording, for a set of input data instances in the input data processed by the trained computer model, a neural flow through the plurality of layers of neurons to thereby generate recorded neural flows;
deploying the trained computer model to a computing platform; and
verifying an integrity of the deployed trained computer model based on a runtime neural flow of the deployed trained computer model and the recorded neural flows.

12. The computer program product of claim 11, wherein the trained computer model outputs, for each set of input data instances processed by the trained computer model, an output class that is one of a plurality of possible output classes, and wherein the neural flow attestation engine further performs the operations of:
generating, for each class in the plurality of possible output classes, a neural flow model based on the recorded neural flows; and
storing, each neural flow model in a measurement database, wherein verifying the integrity of the deployed trained computer model comprises comparing the runtime neural flow to one or more of the stored neural flow models in the measurement database.

13. The computer program product of claim 12, wherein generating, for each class in the plurality of possible output classes, a neural flow model based on the recorded neural flows comprises, for each class, aggregating the recorded neural flows associated with that class by at least one of identifying a set of activated neurons and filters or training a machine learning model based on activated neurons and filters taking into account activations and frequency of activation occurrence.

14. The computer program product of claim 12, wherein the measurement database is stored on a tenant computing device associated with a provider of the trained computer model, and wherein the data processing system is a separate computing system of a cloud computing platform.

15. The computer program product of claim 14, wherein verifying the integrity of the deployed trained computer model comprises:
recording the runtime neural flow of the deployed trained computer model based on runtime input data processed by the deployed trained computer model;
transmitting, from the data processing system, the recorded runtime neural flow to the tenant computing device; and
comparing the recorded runtime neural flow with one or more stored neural flow models in the measurement database corresponding to a same class as a runtime output class generated by the deployed trained computer model for the runtime input data.

16. The computer program product of claim 11, wherein verifying the integrity of the deployed trained computer model based on a runtime neural flow of the deployed trained computer model and the recorded neural flows comprises:
determining deviations between the runtime neural flow and one or more recorded neural flows corresponding to a same output class as generated by the deployed trained computing model for the runtime input data; and
determining that the integrity of the deployed trained computer model has been compromised in response to the deviations satisfying a predetermined criterion.

17. The computer program product of claim 16, wherein the neural flow attestation engine further performs the operation of retracting, in response to determining that the execution integrity of the deployed trained computer model has been compromised, the deployed trained computer model from further access by users of the deployed trained computer model.

18. The computer program product of claim 11, wherein recording, for the set of input data instances in the input data, the neural flow through the plurality of layers of neurons comprises:
generating a trusted execution environment (TEE) in the data processing system;
recording, by a neural flow recording component executing within the trusted execution environment, the neural flow through the plurality of layers of neurons for the input data instance; and
generating, by an attestation generation engine executing within the trusted execution environment, an attestation comprising the recorded neural flow through the plurality of layers of neurons for the input data instance and an output class generated by the deployed trained computer model for the input data instance.

19. The computer program product of claim 18, wherein recording, for the set of input data instances in the input data, the neural flow through the plurality of layers of neurons further comprises:

generating, by the attestation generation engine, the attestation further based on a challenge provided by a computing device of a provider of the computer model;

encrypting, by the attestation generation engine, the attestation based on a security key exchanged between the computing device of the provider of the computer model and the TEE, to thereby generate an encrypted attestation; and transmitting, by the data processing system, the encrypted attestation to the computing device of the provider of the computer model.

20. A system, comprising:

at least one processor; and at least one memory coupled to the at least one processor, wherein the at least one memory comprises instructions which, when executed by the at least one processor, cause the at least one processor to implement a neural flow attestation engine configured to:

input data to a trained computer model, wherein the trained computer model comprises a plurality of layers of neurons;

record, for a set of input data instances in the input data processed by the trained computer model, a neural flow through the plurality of layers of neurons to thereby generate recorded neural flows;

deploy the trained computer model to a computing platform; and verify the execution integrity of the deployed trained computer model based on a runtime neural flow of the deployed trained computer model and the recorded neural flows.

21. The system of claim 20, wherein the instructions further cause the at least one processor to implement a neural flow attestation engine configured to:

generate, for each class in the plurality of possible output classes, a neural flow model based on the recorded neural flows; and store each neural flow model in a measurement database, wherein verifying the execution integrity of the deployed trained computer model comprises comparing the runtime neural flow to one or more of the stored neural flow models in the measurement database.

22. The system of claim 20, wherein the instructions cause the at least one processor to implement a neural flow attestation engine configured to record, for the set of input data instances in the input data, the output class generated by the trained computer model and the neural flow through the plurality of layers of neurons at least by:

generating a trusted execution environment (TEE) in the data processing system;

recording, by a neural flow recording component executing within the trusted execution environment, the neural flow through the plurality of layers of neurons for the input data instance; and generating, by an attestation generation engine executing within the trusted execution environment, an attestation comprising the recorded neural flow through the plurality of layers of neurons for the input data instance and an output class generated by the deployed trained computer model for the input data instance.

23. A method, in a data processing system comprising at least one processor and at least one memory, the at least one memory comprising instructions that are executed by the at least one processor to configure the at least one processor to implement a neural flow attestation engine, the method comprising:

inputting, by the neural flow attestation engine, input data to a trained computer model, wherein the trained computer model comprises a plurality of layers of neurons;

recording, by the neural flow attestation engine, for a set of input data instances in the input data processed by the trained computer model, a neural flow through the plurality of layers of neurons, to thereby generate recorded neural flows;

deploying the trained computer model to a computing platform; and verifying, by the neural flow attestation engine, an integrity of the deployed trained computer model based on a runtime neural flow of the deployed trained computer model and the recorded neural flows, wherein recording the neural flow through the plurality of layers of neurons for an input data instance comprises:

generating a trusted execution environment (TEE) in the data processing system; and generating, by an attestation generation engine executing within the TEE, an attestation comprising the recorded neural flow through the plurality of layers of neurons for the input data instance and an output class generated by the deployed trained computer model for the input data instance.

* * * * *